United States Patent
Sharma

(10) Patent No.: US 8,340,354 B2
(45) Date of Patent: Dec. 25, 2012

(54) METHOD AND APPARATUS FOR OBJECT DETECTION IN AN IMAGE

(75) Inventor: Vinay Sharma, Dallas, TX (US)

(73) Assignee: Texas Instruments Incorporated, Dallas, TX (US)

(\*) Notice: Subject to any disclaimer, the term of this patent is extended or adjusted under 35 U.S.C. 154(b) by 430 days.

(21) Appl. No.: 12/691,158

(22) Filed: Jan. 21, 2010

(65) Prior Publication Data

US 2010/0183195 A1 Jul. 22, 2010

Related U.S. Application Data

(60) Provisional application No. 61/146,158, filed on Jan. 21, 2009.

(51) Int. Cl.
*G06K 9/00* (2006.01)
(52) U.S. Cl. ........................................ 382/103; 348/169
(58) Field of Classification Search .................. 382/100, 382/103, 165, 181, 190, 195, 206, 260–265; 348/169–172
See application file for complete search history.

(56) References Cited

U.S. PATENT DOCUMENTS

| | | | | |
|---|---|---|---|---|
| 4,731,864 A | * | 3/1988 | Modla | ........................... 382/255 |
| 6,556,193 B1 | * | 4/2003 | Auld et al. | .................... 345/418 |
| 7,430,303 B2 | * | 9/2008 | Sefcik et al. | .................. 382/103 |
| 7,957,556 B2 | * | 6/2011 | Aimura et al. | ................ 382/103 |
| 8,045,759 B2 | * | 10/2011 | Mizutani et al. | .............. 382/103 |
| 2009/0066490 A1 | * | 3/2009 | Mitzutani et al. | ............. 340/435 |

OTHER PUBLICATIONS

M. Park, et al., "Performance Evaluation of State-of-the-Art Discrete Symmetry Detection Algorithms", IEEE Conf. on Computer Vision and Pattern Recognition Conference, 2008.

\* cited by examiner

*Primary Examiner* — Anand Bhatnagar
(74) *Attorney, Agent, or Firm* — Mirna Abyad; W. James Brady; Frederick J. Telecky, Jr.

(57) ABSTRACT

A method and apparatus for detecting at least one of a location and a scale of an object in an image. The method comprising distinguishing the trailing and leading edges of a moving object in at least one portion of the image, applying a symmetry detection filter to at least a portion of the image to produce symmetry scores relating to the at least one portion of the image, and identifying at least one location corresponding to locally maximal symmetry scores of the symmetry scores relating to the at least one portion of the image, and utilizing the at least one location of the locally maximal symmetry scores to detect at least one of a location and a scale of the object in the image, wherein the scale relates to the size of the symmetry detection filter.

18 Claims, 3 Drawing Sheets

METHOD AND APPARATUS FOR OBJECT DETECTION IN AN IMAGE

CROSS-REFERENCE TO RELATED APPLICATIONS

This application claims benefit of U.S. provisional patent application Ser. No. 61/146,158, filed Jan. 21, 2009, which is herein incorporated by reference.

BACKGROUND OF THE INVENTION

1. Field of the Invention

Embodiments of the present invention generally relate to a method and apparatus for object detection and more specifically to object detection in images or a video.

2. Description of the Related Art

Object detection is a fundamental problem in computer vision. In order to analyze the behavior and motion of the objects in a scene, a key challenge is to be able to first reliably detect the objects from video data. Detecting an object involves determining the location and scale of the object.

Numerous video analytics applications are based on acquiring the position and scale of the objects in the scene. For example, object detection is a necessary step before object tracking, since the tracker has to be initialized with the location and scale of the object.

There are several reasons why this is a hard problem. In any given application, there are typically many distinct object classes of interest, e.g., people, vehicles, animals, etc. Further, instances within each object category exhibit a great deal of intra-class variations, e.g., tall vs. short person, coupe vs. sedan, etc. Additionally, there can be variations due to object pose and changes in camera viewpoint. Further, there are artifacts caused due to variations in ambient conditions such as scene illumination.

These challenges can be summarized in the following list of desiderata for an object detection algorithm:
a) Robustness to illumination changes
b) Applicability across object classes
c) View and pose independence
d) Scale independence
e) Speed and efficiency

SUMMARY OF THE INVENTION

Embodiment of the present invention relates to a method and apparatus for detecting at least one of a location and a scale of an object in an image. The method comprising distinguishing the trailing and leading edges of a moving object in at least one portion of the image, applying a symmetry detection filter to at least a portion of the image to produce symmetry scores relating to the at least one portion of the image, and identifying at least one location corresponding to locally maximal symmetry scores of the symmetry scores relating to the at least one portion of the image, and utilizing the at least one location of the locally maximal symmetry scores to detect at least one of a location and a scale of the object in the image, wherein the scale relates to the size of the symmetry detection filter.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

One embodiment of this invention is based on the simple observation that true instantaneous object motion gives rise to symmetries in the image-difference signature. Observing from a fixed vantage point, as an object moves, its leading edge appears to obscure part of the background while its trailing edge reveals part of it. As a result, the intensity difference of two successive images of the moving object shows regions of opposite sign corresponding to the trailing and leading edges of the object. These regions of opposite sign are symmetric about an axis roughly perpendicular to the direction of motion of the object. Our solution is based on the observation that only object motion generates such (a high degree of) symmetry in the image-difference signature.

Figure 1:
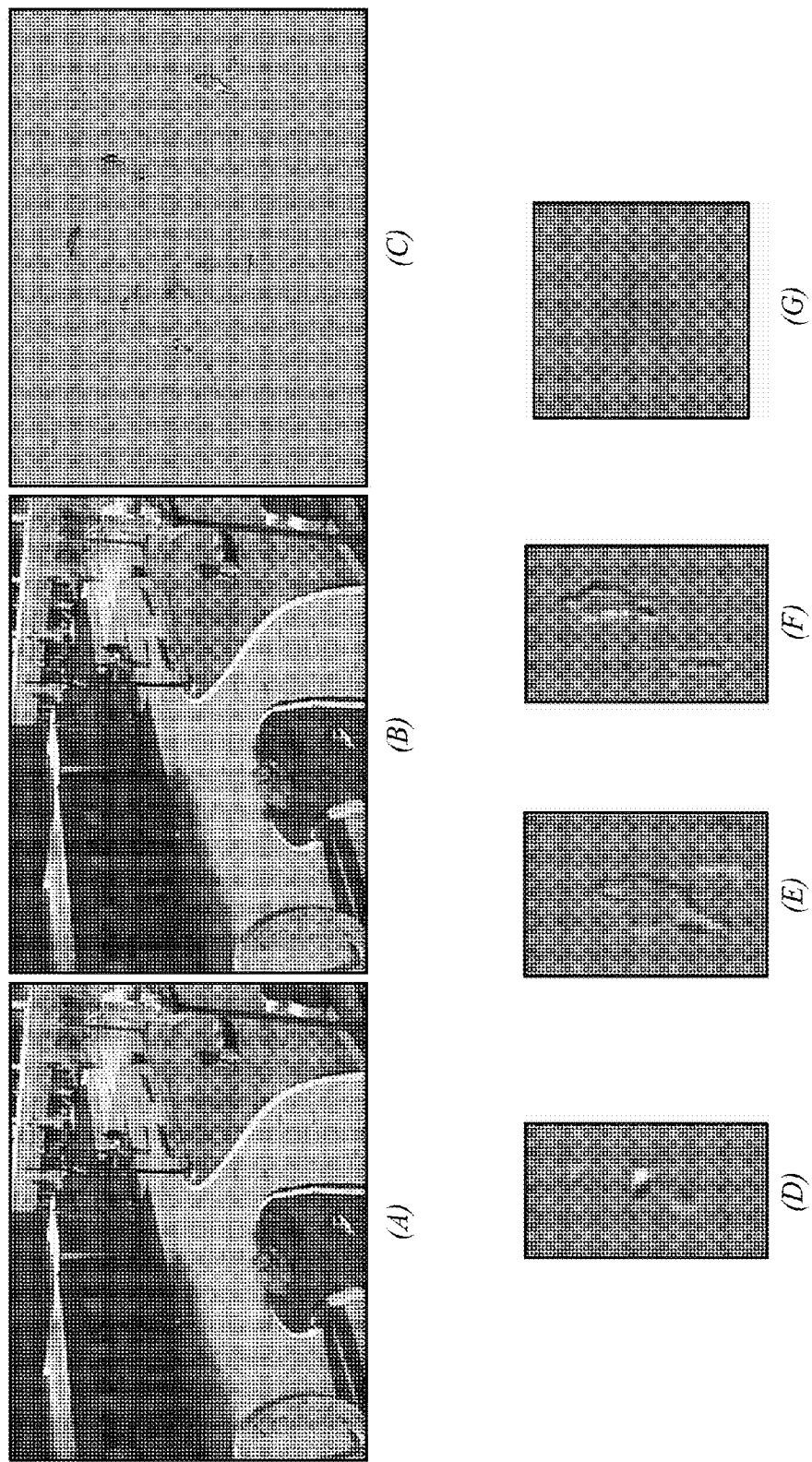
FIG. 1 reflects embodiments of (a) Image $I_t$. (b) Image $I_{t+1}$. (c) Thresholded image difference. (d)-(g) Close-up view of regions from (c) with axis of symmetry overlaid.

Common examples of instantaneous "motion" that do not give rise to such symmetries in image difference are:
a) Sudden or gradual changes in illumination,
b) Diffused shadows, such as, those cast by clouds, smoke, steam, etc.
c) Moving foliage The aforementioned phenomena cause problems for used object detection algorithms, resulting in a large number of spurious detections, false positives. In FIGS. 1(a) and (b) show a pair of successive images $I_t$ and $I_{t+1}$ taken at time instances t and t+1 respectively. FIG. 1(c) shows the image difference $I_{t+1}-I_t$ after applying a low threshold. In FIGS. 1(d)-(g) show several regions of non-zero motion from FIG. 1(c). Notice that the image regions corresponding to true object motion have some degree of symmetry (axis of symmetry overlaid in dotted line), while non-object motion has a largely non-symmetric image-difference signature.

There are many types of symmetry in the image-difference signature, such as, motion symmetry and structural symmetry. Structure symmetry arises due to the fact that the pixels with relatively high absolute values of image difference typically correspond to the occlusion boundaries of the object. And since most commonly found objects have highly symmetric boundaries (e.g., people, cars, bikes, animals), the absolute image difference signature also reflects this symmetry. Motion symmetry arises from the fact that in the signed image-difference signature of a moving object, the pixels corresponding to the trailing edge typically have the opposite sign of pixels corresponding to the leading edge.

The actual method used to compute the degree of symmetry is not integral to the proposed solution. Any desired symmetry computation method that is effectively able to capture the described motion and structural symmetry can be employed.

In one embodiment, we describe an image symmetry filter that produces a symmetry score corresponding to the image locations the filter is applied at. As a simplifying assumption, symmetry may be computed about a horizontal and a vertical axis. Let the scale of the filter be denoted by a window of size h×w. When this filter is centered at pixel coordinate (x,y) of the thresholded image difference image, D, the following terms are computed as a measure of left-right mirror symmetry $$M_{LR} = \frac{\sum_{j=-h/2}^{h/2} \sum_{i=-w/2}^{w/2} D(x+i, y+j) + D(x-i, y+j)}{N_{LR}}$$

$$S_{LR} = \frac{\sum_{j=-h/2}^{h/2} \sum_{i=-w/2}^{w/2} |D(x+i, y+j)| - |D(x-i, y+j)|}{N_{LR}}$$

where $M_{LR}$ denotes motion symmetry, and $S_{LR}$ denotes structural symmetry in the left-right orientation, and $N_{LR}$ is a normalization factor. Similarly, top-down mirror symmetry may be computed using $$M_{TD} = \frac{\sum_{j=-h/2}^{h/2} \sum_{i=-w/2}^{w/2} D(x+i, y+j) + D(x+i, y-j)}{N_{TD}}$$

$$S_{TD} = \frac{\sum_{j=-h/2}^{h/2} \sum_{i=-w/2}^{w/2} |D(x+i, y+j)| - |D(x+i, y-j)|}{N_{TD}}$$

where $M_{TD}$ and $S_{TD}$ denote top-down motion and structural symmetry and $N_{TD}$ is a normalization factor.

A region with high left-right symmetry will have small values of $M_{LR}$ and $S_{LR}$. Similarly, high top-down symmetry corresponds to small values of $M_{TD}$ and $S_{TD}$. The normalization factors ensure that there is a sufficient amount of motion energy within the detection window $$N_{LR} = \min\left[\left(\sum_{j=-h/2}^{h/2} \sum_{i=-w/2}^{0} |D(x+i, y+j)|\right), \left(\sum_{j=-h/2}^{h/2} \sum_{i=0}^{w/2} |D(x+i, y+j)|\right)\right]$$

$$N_{TD} = \min\left[\left(\sum_{j=-h/2}^{0} \sum_{i=-w/2}^{w/2} |D(x+i, y+j)|\right), \left(\sum_{j=0}^{h/2} \sum_{i=-w/2}^{w/2} |D(x+i, y+j)|\right)\right]$$

We also compute the ratio, Z, of the number of pixels in the detection window with zero image-difference to the number of pixels with non-zero image-difference.

The final score assigned to the detection window centered at (x,y) is a function of the quantities described above. Different linear combinations of the left-right and top-down symmetries may be utilized. The following simple combination has been found to yield good results over a variety of different image sequences.

$$Symm(x,y) = S_{LR} + S_{TD} + M_{LR} + M_{TD} + 5*Z$$

There is a certain amount of redundancy in this formulation due to the nature of the proposed motion symmetry measure. Since, the proposed motion symmetry measure M also incorporates the spatial arrangement of the pixels, it actually provides a combined score for motion and spatial symmetry. Thus, an even simpler equation can employed that only makes use of the left-right and top-down motion symmetry $$Symm(x,y) = M_{LR} + M_{TB} + 5*Z$$

When, searching for High Symmetry Image Regions, the pixel-wise difference of the current image and the previous image is computed $$D = I_t - I_{t-1}$$

The image D is then compared to the threshold T so as to zero-out the pixels that have only a small image difference magnitude.

In order to find regions of high symmetry in the image-difference result, the image symmetry filter is scanned at a scale, which maybe fixed, over the entire image. At each location, a symmetry score within the filter window is computed, as described in the previous section. A square filter window of reasonable size (for example, 16×16) has been found to be effective for typical video surveillance applications. Some factors that can influence the choice of filter size and aspect ratio are as follows:

a) A spatially isotropic detection window ensures that the detections are not biased towards objects with particularly oriented shapes. For example, a bounding box around a person is typically narrow and tall, where as for a car it is more wide and short. By employing a square detection window our method is able to compute symmetries in local regions without favoring one object class over another.
As an object moves, strong temporal cues like common fate can then be used to quickly group neighboring square "atomic units" to form shapes that better fit the object.

b) A square of side 16-pixels enables very efficient implementation on a SIMD processor.

Apart from optimizing the actual symmetry computations, checks may be employed to further speed-up the process of scanning the entire image. If a detection window fails any of the conditions described below, the corresponding image location is assigned a pre-defined large value:

a) At least one non-zero image-difference pixel in each of the 4 quadrants of the detection window
b) At least one pixel with a negative image-difference value
c) At least one pixel with a positive image-difference value After computing a symmetry score for each pixel location in the image, "non-minimum suppression" is applied on the symmetry image, Symm, to preserve only those values that correspond to minima within a local window.

Then, our final step is to classify each remaining value in Symm as corresponding to an "object" or not. Since our basic premise is that object locations will have high symmetry, low values of symmetry, a threshold may be applied in order to make this classification $$I(x, y) = \begin{cases} \text{object}, & Symm(x, y) < T \\ \text{not object}, & \text{otherwise} \end{cases}$$

A box with dimensions corresponding to the filter size is then drawn centered at each pixel location (x,y) that passes the threshold. In order to detect objects of varying sizes, a standard multi-resolution image pyramid is constructed, where each level of the pyramid holds a copy of the input image resized using some determined scale factor. The image symmetry filter is applied at each level independently and the scale of the detected object is, determined according to the scale of the pyramid level. The detection results from the different pyramid levels are then combined together to obtain the final set of detections.

Figure 2:
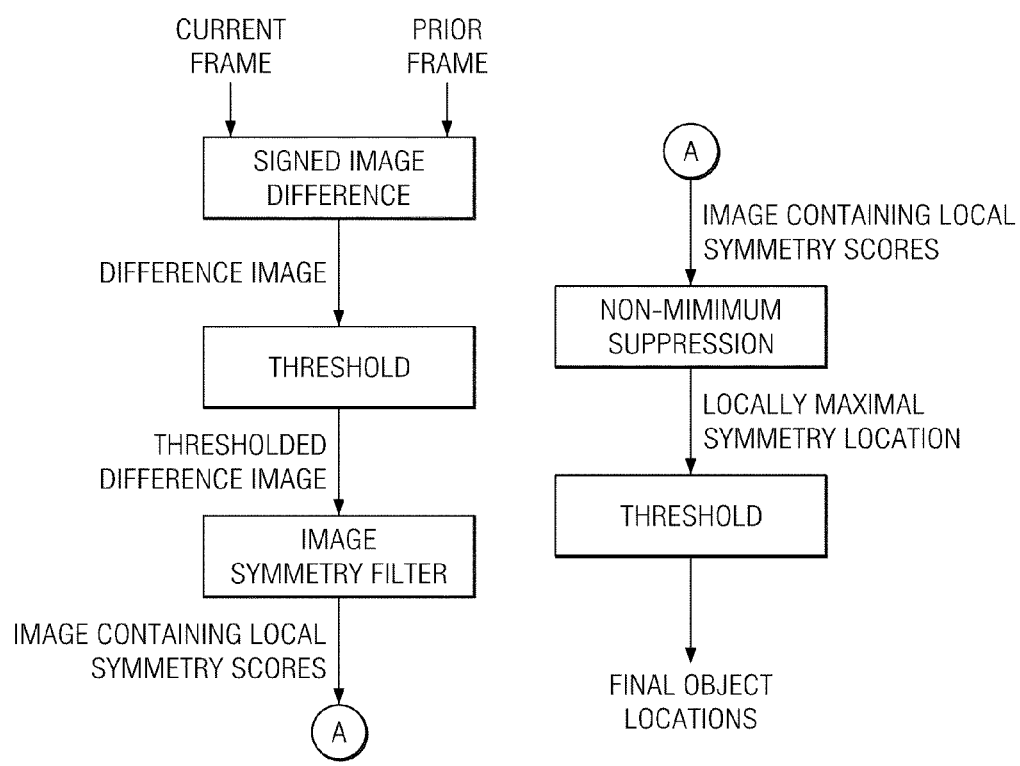
FIG. 2 is an embodiment of the method for object detection in an image.

FIG. 2 is an embodiment of the method for object detection in an image. The method utilizes current and prior frames to generate signed image difference. A threshold is then applied to the difference image, as described above, and a thresholded image is generated. After utilizing an image symmetry filter, image (A) is generated, which contains local symmetry scores. Image A is the then subjected to non-minimum suppression to determine the locally maximal symmetry location. A threshold is then applied to produce the object location.

Figure 3:
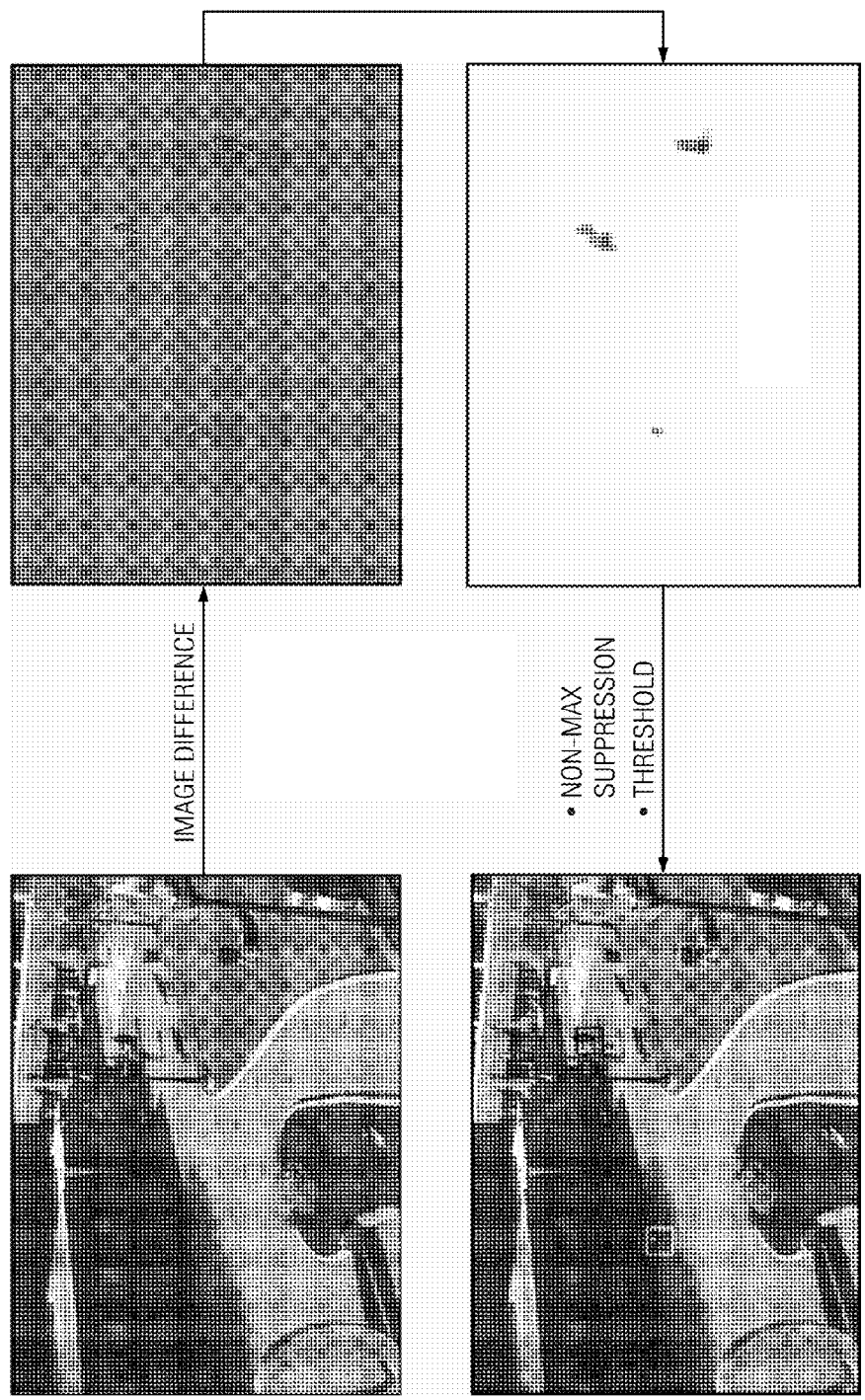
FIG. 3 is an embodiment depicting a pictorial view of the different stages involved in an embodiment of the object detection method.

FIG. 3 is an embodiment depicting a pictorial view of the different stages involved in an embodiment of the object detection method. As shown in FIG. 3, efficient implementation may be considered. The main stages of the detection pipeline are:
a) Thresholded image difference
b) Symmetry computation at each image location
c) Non-minimum suppression
d) Threshold A benefit of the described symmetry computation is that it can be decomposed into a series of 1D filter. This implementation is significantly more efficient than applying a 2D sliding window over the entire image. The simplicity of the computations has further enabled us to implement this method on programmable hardware accelerators.

In one embodiment, the object detection approach may be used to initialize an object tracker. The object detection approach may be employed once every 20 frames, for example, to detect objects of interest in the scene. These detections were used to initialize and correct an object tracker running at 30 frames per second.

In one embodiment, the present method utilizes the observation of symmetry in the instantaneous motion signature to locate objects in an image. Thus, in one embodiment, the proposed method and apparatus are:
a) Exploiting the observation of motion and structural symmetry in instantaneous image-difference signature. True object motion results in high symmetry, where as non-object motion caused by illumination variations, random motion, such as, tree foliage, image noise, etc., does not.
b) Measuring structural and motion symmetries for object detection in a computationally inexpensive manner, that is amenable to optimized implementation.
c) Employing a square (isotropic) detection window to scan the image while searching for high symmetry regions, which eliminates any bias towards specific shapes.
d) Strong and more reliable temporal cues such as common fate to be used to group square "atomic units" so as to better fit specific object shapes.

Such a solution may have several advantages over other solutions to the same problem. As mentioned earlier, as ideal object detection approach should have the following characteristics:
a) Robust to illumination changes
b) Applicable across object classes
c) View and pose independent
d) Scale independent
e) Fast and efficient Common approaches to object detection satisfy some of these requirements, but are found severely lacking in other aspects.

Background-subtraction based approaches are applicable across the object classes, are usually independent of scale and viewpoint, and are fast and efficient. However, these methods are prone to be severely hampered by changes in illumination. Variations in ambient lighting conditions are a very common occurrence in almost any realistic scene, and can occur due to a variety of reasons, e.g., flickering lights, lights switched on/off, clouds, smoke, steam, etc., obscuring sunlight, automatic gain control in a camera compensating for a bright object appearing in the scene, etc. These illumination changes typically result in a large number of spurious object detections, false positives, and also result in incorrect estimation of object size and position.

Learning-based methods are generally reasonably robust to variations in illumination. However, since these methods rely on an extensive training phase to classify objects, these methods are not applicable to different object categories at once. For example, in order to be able to detect people and cars, one has to typically apply two separate instances of the detection approach, once to detect people, and then to identify cars. Again, due to the reliance on training datasets, these methods are not independent of the camera viewpoint and object pose. Most techniques in this category work best from a particular camera viewpoint and for a specific object pose, with very little variation allowed in either parameter. These methods achieve scale independence by employing a multi-resolution approach using image-pyramids. Lastly, these methods are typically expensive in terms of processor and memory resources. Some fast and efficient implementations exist for certain algorithms, but even these are significantly more expensive than background-subtraction based methods.

The proposed solution may provide the following benefits without the shortcomings:
a) Our method relies on symmetries in instantaneous image difference signature and hence is robust to illumination changes
b) It is a bottom-up approach (similar to background-subtraction) and hence is applicable across several object categories
c) Since structural and motion symmetries are apparent from any camera view and object pose, it is view and pose independent
d) Multi-resolution approaches (like used with learning-based methods) using image-pyramids can be used for scale independent implementation
e) Since our method relies on simple computations and is designed to exploit SIMD implementation it is very fast It should be noted that the method described herein may be executed by a digital signal processor (DSP). Through out this application, a computer readable medium is any medium that a computer can access for data archiving, executing, storing, retrieving and the like. While the foregoing is directed to embodiments of the present invention, other and further embodiments of the invention may be devised without departing from the basic scope thereof, and the scope thereof is determined by the claims that follow.

What is claimed is:

1. A method of a circuit unit for detecting at least one of a location and a scale of an object in an image, comprising:
distinguishing the trailing and leading edges of a moving object in at least one portion of the image;
applying a symmetry detection filter to at least a portion of the image to produce symmetry scores relating to the at least one portion of the image;
identifying at least one location corresponding to locally maximal symmetry scores of the symmetry scores relating to the at least one portion of the image; and
utilizing the at least one location of the locally maximal symmetry scores to detect at least one of a location and a scale of the object in the image, wherein the scale relates to the size of the symmetry detection filter.

2. The method of claim 1, wherein the step of distinguishing the trailing and leading edges generates another image.

3. The method of claim 2, wherein the symmetry detection filter is applied of the other image.

4. The method of claim 1, wherein the identifying step generates more than one location of close proximity to one another.

5. The method of claim 4, wherein the more than one location are at least one of identified as one location or grouped to become a single location.

6. The method of claim 4, wherein the more than one location are at least one of identified as one scale or grouped to represent a single scale.

7. An apparatus for detecting at least one of a location and a scale of an object in an image, comprising:
   means for distinguishing the trailing and leading edges of a moving object in at least one portion of the image;
   means for applying a symmetry detection filter to at least a portion of the image to produce symmetry scores relating to the at least one portion of the image;
   means for identifying at least one location corresponding to locally maximal symmetry scores of the symmetry scores relating to the at least one portion of the image; and
   means for utilizing the at least one location of the locally maximal symmetry scores to detect at least one of a location and a scale of the object in the image, wherein the scale relates to the size of the symmetry detection filter.

8. The apparatus of claim 7, wherein the means for distinguishing the trailing and leading edges generates another image.

9. The apparatus of claim 8, wherein the symmetry detection filter is applied of the other image.

10. The apparatus of claim 7, wherein the means for identifying generates more than one location of close proximity to one another.

11. The apparatus of claim 10, wherein the more than one location are at least one of identified as one location or grouped to become a single location.

12. The apparatus of claim 10, wherein the more than one location are at least one of identified as one scale or grouped to become a single scale.

13. A non-transitory computer readable medium comprising software that, when executed by a processor, causes the processor to perform a method for detecting at least one of a location and a scale of an object in an image, comprising:
   distinguishing the trailing and leading edges of a moving object in at least one portion of the image;
   applying a symmetry detection filter to at least a portion of the image to produce symmetry scores relating to the at least one portion of the image;
   identifying at least one location corresponding to locally maximal symmetry scores of the symmetry scores relating to the at least one portion of the image; and
   utilizing the at least one location of the locally maximal symmetry scores to detect at least one of a location and a scale of the object in the image, wherein the scale relates to the size of the symmetry detection filter.

14. The computer readable medium of claim 13, wherein the step of distinguishing the trailing and leading edges generates another image.

15. The computer readable medium of claim 14, wherein the symmetry detection filter is applied of the other image.

16. The computer readable medium of claim 13, wherein the identifying step generates more than one location of close proximity to one another.

17. The computer readable medium of claim 16, wherein the more than one location are at least one of identified as one location or grouped to become a single location.

18. The computer readable medium of claim 16, wherein the more than one location are at least one of identified as one scale or grouped to become a single scale.

* * * * *